(12) United States Patent
Ragwitz et al.

(10) Patent No.: US 6,909,198 B2
(45) Date of Patent: Jun. 21, 2005

(54) METHOD AND DEVICE FOR PROCESSING AND PREDICTING THE FLOW PARAMETERS OF TURBULENT MEDIA

(75) Inventors: Mario Ragwitz, Dresden (DE); Holger Kantz, Dresden (DE)

(73) Assignee: Max-Planck-Gesellschaft zur Forderung der Wissenschaften e.V. (DE)

(*) Notice: Subject to any disclaimer, the term of this patent is extended or adjusted under 35 U.S.C. 154(b) by 167 days.

(21) Appl. No.: 10/332,185

(22) PCT Filed: Jul. 3, 2001

(86) PCT No.: PCT/EP01/07608

§ 371 (c)(1),
(2), (4) Date: Apr. 25, 2003

(87) PCT Pub. No.: WO02/05041

PCT Pub. Date: Jan. 17, 2002

(65) Prior Publication Data

US 2003/0160457 A1 Aug. 28, 2003

(30) Foreign Application Priority Data

Jul. 7, 2000 (DE) .......................... 100 33 183

(51) Int. Cl.$^7$ ................................. F02D 7/02
(52) U.S. Cl. ........................... 290/44; 290/55
(58) Field of Search .................. 290/43, 44, 54, 290/55; 417/334; 416/31

(56) References Cited

U.S. PATENT DOCUMENTS

| 4,461,957 | A | * | 7/1984 | Jallen | 290/44 |
| 4,700,081 | A | * | 10/1987 | Kos et al. | 290/44 |
| 5,083,039 | A | * | 1/1992 | Richardson et al. | 290/44 |
| 5,289,041 | A | | 2/1994 | Holley | |
| 5,544,524 | A | | 8/1996 | Huyer et al. | |
| 5,798,631 | A | * | 8/1998 | Spee et al. | 322/25 |
| 6,320,272 | B1 | * | 11/2001 | Lading et al. | 290/44 |
| 6,320,273 | B1 | * | 11/2001 | Nemec | 290/55 |

FOREIGN PATENT DOCUMENTS

| DE | 41 02 923 A1 | 8/1992 |
| DE | 198 51 559 A1 | 5/1999 |
| EP | 0 582 069 A2 | 2/1994 |
| EP | 0 926 576 A2 | 6/1999 |
| JP | 8-166465 | 6/1996 |
| WO | WO 98/42980 | 10/1998 |

OTHER PUBLICATIONS

U. Schlink et al.,"Wind Speed Forecasting from 1 to 30 Minutes", 1998, Theor. Appl. Climatol., 60, pp. 191–198.
H. Kantz et al., "Nonlinear time series analysis", 1997, Cambridge University Press.
M. Casdagli, "Chaos and Deterministic versus Stochastic Non–linear Modeling", 1991, J. R. Statist. Soc. B, 54 No. 2, pp. 303–328.

(Continued)

Primary Examiner—Nicholas Ponomarenko
(74) Attorney, Agent, or Firm—DLA Piper Rudnick Gray Cary US LLP

(57) ABSTRACT

Described is a method for processing and/or predicting flow data of a flowing medium, in which from values of at least one flow parameter which are successively measured on a continuous basis at one or various locations in the medium, said flow parameter being characteristic for the speed of the medium, a time series is formed and updated which is subjected to a nonlinear deterministic prediction procedure on the basis of a locally constant phase space model for generating prediction values for the respective subsequent flow parameters, wherein a predetermined control signal is generated if the prediction values are characteristic for an impending change in the flow speed. Applications of the method for controlling wind generators are also described.

14 Claims, 10 Drawing Sheets

OTHER PUBLICATIONS

Figure 1:
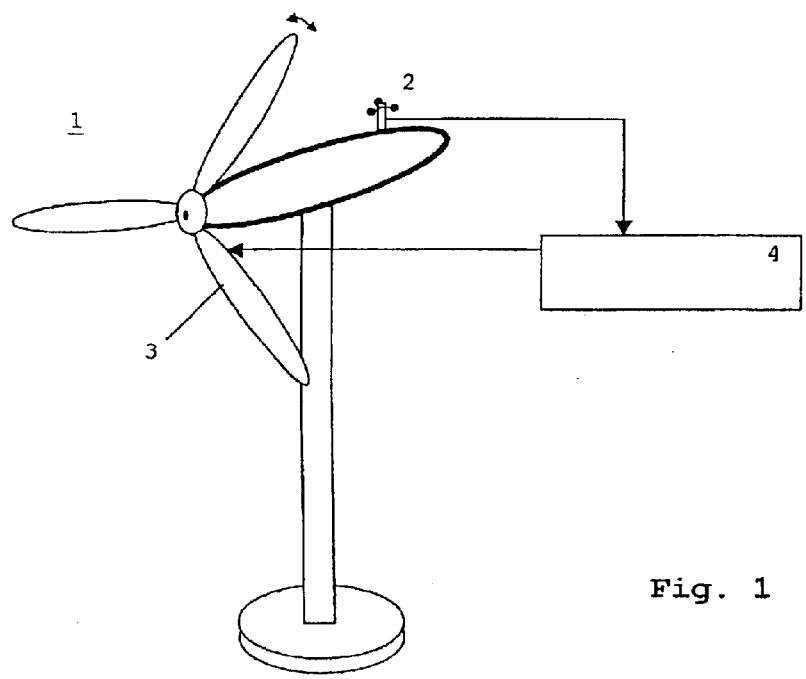

F. Takens, "Detecting Strange Attractors in Turbulence", 1981, Lecture Notes in Math, *Springer, New York*, vol. 898.

Tim Sauer et al., "Embedology", 1991, *Journal of Statistical Physics.*, vol. 65, No. 3/4, pp. 579–616.

John F. Gibson et al., "An analytic approach to practical state space reconstruction", 1992, *Physica D*.

"Wind Conditions for Wind Turbine Design", Apr. 12–13, 1999, *International Energy Agency*, $2^{nd}$ Symposium, ISSN 0590–8809.

Henry D.I. Abarbanel, *Analysis of Observed Chaotic Data*, Springer, New York 1996.

Johannes Hausmann and Martin Hoffmann *Zeitreihen-vorhersage und Steruerung autonomer Wind–Diesel–Systerne mit neuronalen Netzwerken* May 12, 1995.

\* cited by examiner

METHOD AND DEVICE FOR PROCESSING AND PREDICTING THE FLOW PARAMETERS OF TURBULENT MEDIA

The invention relates to methods for processing flow parameters of turbulent media, in particular methods for predicting the flow speed of flowing media, and for predicting particular nonlinear effects, e.g. of gusts in atmospheric air movement. The invention further relates to the application of such methods for controlling the operational parameters of mechanical devices in turbulent flows, e.g. wind-driven power generators, and devices for implementing such methods. The invention also addresses the control of complex technical processes in which wind speed forecasting is of importance, as is the case for example at airports, in the control of wind-diesel systems or in the case of integration of wind generators in supply networks.

The investigation of media (liquids or gases) with turbulent flow characteristics is of interest in a host of different technical areas. For example, there is an endeavour to better understand the dynamics of atmospheric air movement near the surface of the earth (wind dynamics) in order to obtain information for weather forecasting or for the forecasting of turbulence. These two tasks differ in the prediction timeframe and in the spatial resolution of the prediction. Specifically matched prediction models are applied to resolve these tasks. Numerical methods from continuum mechanics based on Navier-Stokes equations are used for weather forecasting with a longer forecasting horizon of at least a few hours, with said equations outputting the predicted wind field in the spatial volume under consideration. Basically, one of the following models can be used for local turbulence forecasting with a shorter time horizon in the seconds or minutes range.

First of all, it is possible in local turbulence forecasting, too, to use the solution of Navier-Stokes equations. Theoretically, the field equations can be resolved from the known starting values of wind speed and pressure in the medium and from boundary conditions, and on this basis, forecasts can be made. In principle, numeric solutions of the respective partial differential equations are difficult and in the typically high Reynolds' numbers under atmospheric conditions almost impossible. Usual methods of approximations (e.g. linearisation of equations, reduction in the dimensionality or assumption of the freedom of rotation of the vector field) cannot be carried out because nonlinearity, three-dimensionality and the occurrence of eddies are of decisive significance for the nature of the solutions. Furthermore, the vast expansion of the atmospheric system and the large distance between the atmospheric boundary layer and a state of equilibrium make numeric examination of the field equations more difficult. Moreover, there is hardly a practical situation where the initial conditions and the boundary conditions can be stated with adequate accuracy in order to make integration of the equation possible. The solution of the hydrodynamic equations thus does not provide a practically relevant option for the problem to be considered.

Furthermore, the application of linear-stochastic models is possible. When applying linear methods, the basic hypothesis consists of regarding the measured time series of characteristic flow data as a superposition of several periodic signals whose temporal development is modified by additional dynamic noise. In this view, the value of the time series at a later point in time is a linear combination of values at earlier points in time and additive noise. Generally, the linear methods are disadvantageous because in some cases valuable prediction information is lost in the noise portion. In situations where predictings have to be made on the basis of one or just a few measured time series where no boundary conditions and initial conditions of adequate spatial resolution exist, at present, typically, the following linear methods are used (see U. Schlink in "Theor. Appl. Climatol." vol. 60, 1998, p. 191 ff). Linear correlations of the solution of Navier-Stokes equations, or of the measured data, are evaluated, and the deviation from the linear correlations as a result of noise are approximated. Linear-stochastic prediction requires the existence of pronounced global linear-deterministic portions in the flow behaviour in order to achieve adequate forecasting results from linear correlations in the time series measured. In this context, "global" means that linear correlations between the last measured values of the time series at the spatial points examined and the value to be forecast, of the wind speed, are assumed to be constant at all times and in all weather situations. Thus, the deterministic portion of any behaviour which can be represented by linear-stochastic models is limited to a relatively small class of possible processes. Essentially, harmonic oscillations and exponential behaviour can be modelled. However, these models fail in the case of chaotic time series with a nonlinear deterministic character. The most important class of linear-stochastic models are autoregressive models (AR models) which are discussed in detail below.

A third approach to forecasting flow speeds in turbulent media uses methods of nonlinear time series analysis based on the concepts of the low-dimensional deterministic chaos. In particular, as a result of the complex dynamic behaviour of atmospheric air masses, the flow parameters follow aperiodic progressions which are difficult to predict and often also difficult to classify. With nonlinear time series analysis, an attempt is made to learn as much as possible about the characteristics or the state of the system under examination, from observed measured data. For example H. Kantz et al. in "Nonlinear Time Series Analysis", Cambridge University Press, Cambridge, 1997 or H. B. I. Abarbanel in "Analysis of Observed Chaotic Data", Springer, N.Y., 1996 describe known analysis methods for understanding aperiodic signals. These methods are based on the concept of deterministic chaos. Deterministic chaos means that a system state at a specific point in time unequivocally determines the system state at any later point in time, but with the system nevertheless being unforeseeable over an extended period of time. This is due to the fact that the current system state is acquired with an unavoidable error whose effect increases exponentially, depending on the motion equation of the system. After a system-typical time, a simulated model state no longer bears any resemblance to the real state of the system. For shorter periods of time, system states which are represented by characteristic patterns in the time series can however be forecast with good accuracy.

The subject of time series analysis of wind data is for example discussed by M. Casdagli in "J. R. Statist. Soc. B." vol. 54, 1991, pp. 303 ff. and by J. Hausmann "Zeitreihenanalyse und Steuerung autonomer Wind-Diesel-Systeme mit neuronalen Netzwerken" [Time series analysis and control of autonomous wind-diesel systems with neuronal networks], diploma thesis, University of Oldenburg, 1995. As far as the analysis of scalar (univariate) time series is concerned, it has been shown that the prediction errors from the linear-stochastic models on the one hand, and the nonlinear time series analysis on the other hand, averaged over time, would seem to produce the same (poor) reliability of the models. The above-mentioned studies show that the concept of deterministic chaos, averaged over the observation time period, is unable to achieve any decisive improvement in turbulence forecasting. Averaged over time, the univariate, nonlinear time series analysis, provides significant advantages only for predicting slightly turbulent data with few excited degrees of freedom. The Reynolds number is the control parameter for turbulence. Turbulent media with Reynolds numbers of up to approx. $10^2$ can be described well by low-dimensional-deterministic models. However, atmospheric turbulence in airflows close to the ground are characterised by Reynolds numbers which are higher by several orders of magnitude. Thus, such phenomena can generally not be described by concepts of deterministic chaos. For this reason, the concept of the nonlinear time series analysis for analysing atmospheric wind data and in particular for forecasting nonlinear effects such as wind gusts was not taken into consideration.

It is also known to describe stochastic processes using so-called Markov rules. In a Markov process of the mth order, the last m measuring values suffice to forecast the probability distribution of the value to be forecast. In contrast to deterministic processes, in a Markov process one does not know the exact value of the future observation, only its probability distribution.

Strong changes in wind speed as a result of turbulence present considerable difficulties in energy generation using wind power. In particular, the following three problem areas occur. Firstly, wind gusts threaten the mechanical stability of rotors, thus considerably reducing the service life of turbines. This applies above all to wind generators in low mountain range situations. Secondly, if the devices are integrated in an electricity supply network, wind gusts can also cause considerable fluctuations in the power supplied to the network. This results in reduced quality of the voltage provided in the network. Finally, when there is no wind, there is a lack of supply reliability, above all in decentrally used, isolated wind-power generation plants comprising additional diesel units for conventional energy production. If fluctuations require switching over to conventional energy production, there is a delay, for example because diesel units cannot react with sufficient speed.

There is thus an interest in processing flow parameters in order to acquire current system states or in order to be able to forecast, with as much accuracy as possible, states which will occur in the near future. Thus, as an example, depending on weather conditions, wind power generators are operated at the highest possible output up to the highest possible wind speeds in order to achieve optimum energy conversion. However, in order to prevent the occurrence of mechanical damage, a wind power generator has to be decelerated above a certain wind speed. Typically, such deceleration takes place electrically by regulating the generator resistance, or mechanically by adjusting the rotor blades of the wind power generator. Up to now such regulation has taken place on the basis of the currently measured wind speed during emergency stops or on the basis of the current generator output for permanent regulation. Due to the inertia of the rotor and time delays in the measuring and evaluation system, the conventional regulation always lags behind. In particular in the case of wind gusts, this can lead to a considerable increase in the current mechanical load of the plant. If it were possible to forecast these abrupt increases in wind speed, then the load on the plant could be reduced and/or the effectiveness of energy conversion could be enhanced. The latter would be possible by operating the plant at higher average output.

In order to ensure safety of the plant even during wind gusts, i.e. during temporary turbulent increases of the wind speed, deceleration must occur already at a relatively low average wind speed. Averaged over time in continuous operation, this means limiting the effectiveness of energy conversion. If the flow state of the air in a real situation could be acquired and forecast more accurately, the effectiveness of power generation as well as the service life of the turbine could clearly be increased.

Theoretically, a solution to the problem mentioned is imaginable by direct measurement of the wind speed at a distance from the wind power generator. However, in practical application this idea has some significant disadvantages. Firstly, it requires expensive hardware modifications. A whole array of measuring stations would be necessary because the wind blows from different directions at different times and at different average wind speeds. This idea is associated with a further difficulty in that hydrodynamic turbulence happens not to be characterised by a directional translation of stationary events, but rather is a dynamic phenomenon. Wind gusts can arrive from various directions and can strengthen or weaken at the place where the turbine is located.

The desire for acquiring local turbulence in the atmosphere not only exists with operating and connecting wind power generators to the network, but also with other devices which react sensitively to naturally (wind) or artificially created eddies or turbulence (e.g. in the area of an airport or building site).

It is the object of the invention to provide an improved method for processing flow parameters, which method makes it possible to determine and/or predict changes in speed in flowing media with increased prediction accuracy. Furthermore, it is the object of the invention to provide a device for implementing the method and for applications for controlling wind power generators and their integration in power supply networks.

These objects are solved by processes and devices with the features according to claim 1 or 12, respectively. Advantageous embodiments and applications of the invention are provided in the dependent claims.

The basic idea of the invention comprises the processing of flow data of a flowing medium, with the following steps. In succession, at least one flow parameter is currently measured which is characteristic for the speed of the medium, and from the measured values, an updated time series is formed whose last element corresponds to the flow parameter which has just been measured. If the flow parameter or parameters are measured in one location in the medium, the time series is scalar (univariate embodiment). If measurements are taken in various places, the time series is vectorial (multivariate time series). Each time series is subjected to a prediction procedure for generating prediction values (or: prediction data) for the flow parameters which follow in each particular case. The prediction procedure is based on the nonlinear deterministic model. From the prediction procedure, prediction values for characterising the probable system behaviour during the subsequent time are derived and/or provided for further processing steps. If the prediction data are characteristic for an impending change in the flow speed, e.g. for the impending arrival of a turbulence, at least one control signal is generated which is displayed and/or used for initiating certain system reactions. The amplitude of the forecast speed, or the forecast change in speed can be used as a criterion for impending turbulence.

Advantageously, control signal generation, according to the invention, with the nonlinear deterministic prediction model makes it possible to significantly reduce the prediction error. This represents a surprising result because up to now it was assumed that the prediction model would not be optimally adapted to the dynamics of systems with turbulent air flows. However, it has been found that the prediction errors, which are significant when averaged over time, of the prediction procedure which is known per se can be reduced when only predictions in the area of considerable increases in speed are taken into account, or when it is possible to derive the average of several isochronous (simultaneous) forecasts.

The findings, that the prediction methods, used here, of nonlinear time series analysis can also be applied to describe a particular class of stochastic processes, namely Markov processes, constitutes an important aspect of the invention. The invention is in particular based on the findings that locally constant prediction models used according to the invention are optimally suited to determining Markov rules in stochastic processes. The inventors have recognised that the increments of wind speeds can be described well by nonlinear Markov processes in time, and that thus, models of nonlinear time series analysis are well suited to predicting expected values of the increments. This feature results in particularly advantageous behaviour in situations where several predictions are made at the same point in time and are averaged over the prediction values. This is the case for example when integrating renewable energy carriers in power supply networks.

According to a preferred embodiment of the invention, the movement of flowing air masses is acquired. The flow parameters of the medium of air (wind data) comprise in particular wind speed or quantities derived from it. In applications concerning wind power generators or wind power plants, for example the electrical power generated at the wind power generator constitutes a flow parameter based on a derived quantity, which flow parameter is used for predicting according to the invention. This has the advantage that the output directly reflects the spatially averaged wind speed, and provides the usual control quantity of conventional control of wind power plants. It is also possible, for example, to use the deviation between a currently measured value of the wind speed and the average over time, as the derived quantity. There is particular interest in predicting turbulent wind flows (gusts) for short periods of time (ranging from a few seconds to e.g. 20 seconds) or generally impending speed changes for extended periods of time (up to several minutes).

According to a preferred application of the invention, prediction data are used in order to set or regulate operational parameters of a mechanical device arranged in the flowing medium, e.g. of a wind power generator. In a wind power generator, it is preferable if a control system is provided which is based on the method described above. If the prediction data of the nonlinear deterministic model indicates a high wind speed or wind speed change, then the above-mentioned control signal activates an actuating device of the wind power generator, said actuating device initiating at least temporary deceleration of the generator. Such regulation has the advantage in that it is possible to react in time and with increased reliability to dangerous turbulence, thus reducing the average mechanical load on the plant, and in that it is further possible to operate the generator up to an increased average wind speed.

A further preferred application of the invention relates to integration of renewable energy sources in larger power supply networks. If for example, a large number of wind power generators feed their output to a supply network and if the output which will be produced is to be forecast, it is less important to have a precise prediction for each individual turbine, but more important to have a good estimate of the average value of the output to be forecast. If for example, an increase in the power output of 10% of a number of N generators is forecast, it is not important that the power of each individual turbine increases by 10%. But rather, it is of importance to the power supplier that the output on average increases by the value forecast.

Assuming that the wind speed suffices for a Markov process and that the Markov rules for various groups of generators are identical, a locally constant model is optimally matched to the problem of predicting the average power output of wind turbines.

Another subject of the invention is a device for processing flow data, with said device being suitable for implementing the above-mentioned method, and comprising in particular a measuring device for acquiring the desired flow parameters, a computing device for preparing and processing the time series, a comparison device for comparing the system conditions and/or predicting values with predetermined reference criteria, and an output device for prediction values and/or control signals derived therefrom.

The invention is applied with particular advantage to the control of wind generators. In this process, the particular situation in wind farms can also be utilised. In a wind farm, several wind generators are operated within a short distance, typically less than 100 m. These generators supply simultaneously recorded values of the output values or the wind speed. Analogous to an individual time series, this multivariate vector-value time series can be used to solve the above-mentioned prediction problem. Processing flow data with the use of the entire spatial information as it is available in wind farms is thus also a subject of the invention. Processing of the vector-value time series is discussed below.

The application is not limited to particular time horizons. Since the speed data during turbulence or during slower wind speed changes over time shows similar structures, the principles can be applied with any time horizons. If necessary, correspondingly adapted expanded time series are evaluated.

The invention has numerous advantages which on the one hand are directly connected to the reduction in the prediction error when characterising flowing media, and on the other hand, derived from it, are connected with economic advantages during the operation of technical systems in or with the flowing media. Further advantages consist of the ability of achieving reliable predictions with a relatively modest computing effort so that devices according to the invention for system predictions or system control can be integrated into existing systems without any problems.

Figure 2:
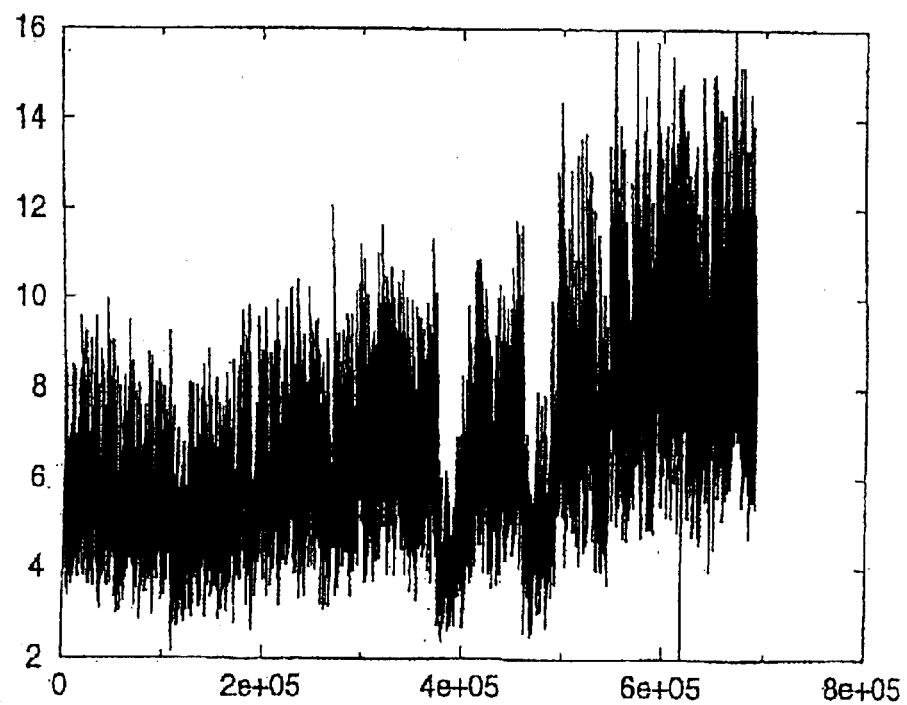
Figure 3:
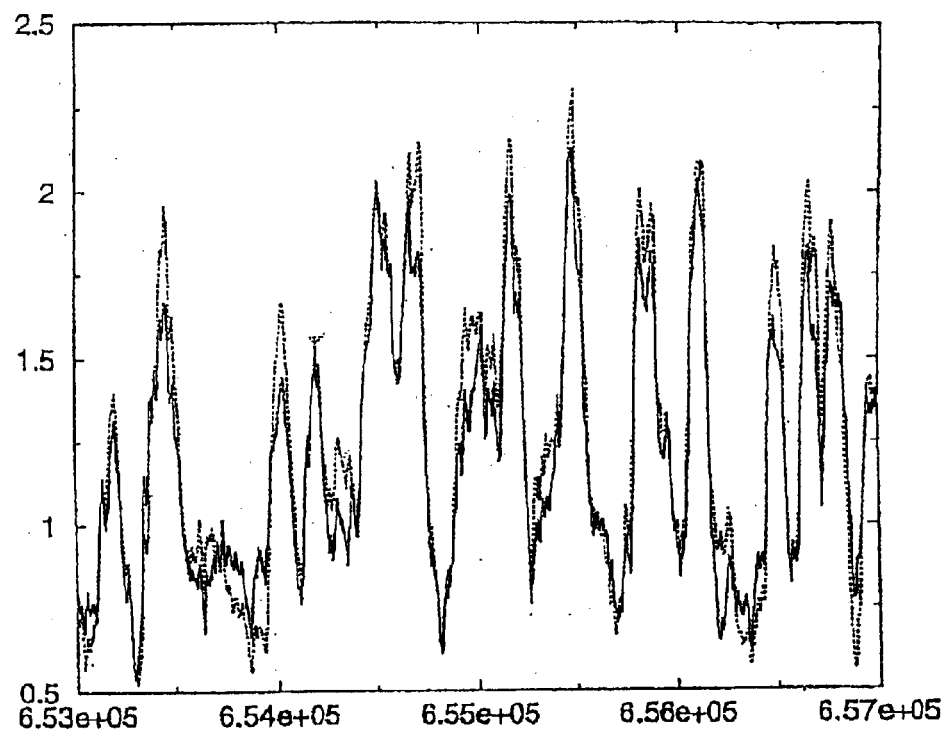
Figure 4:
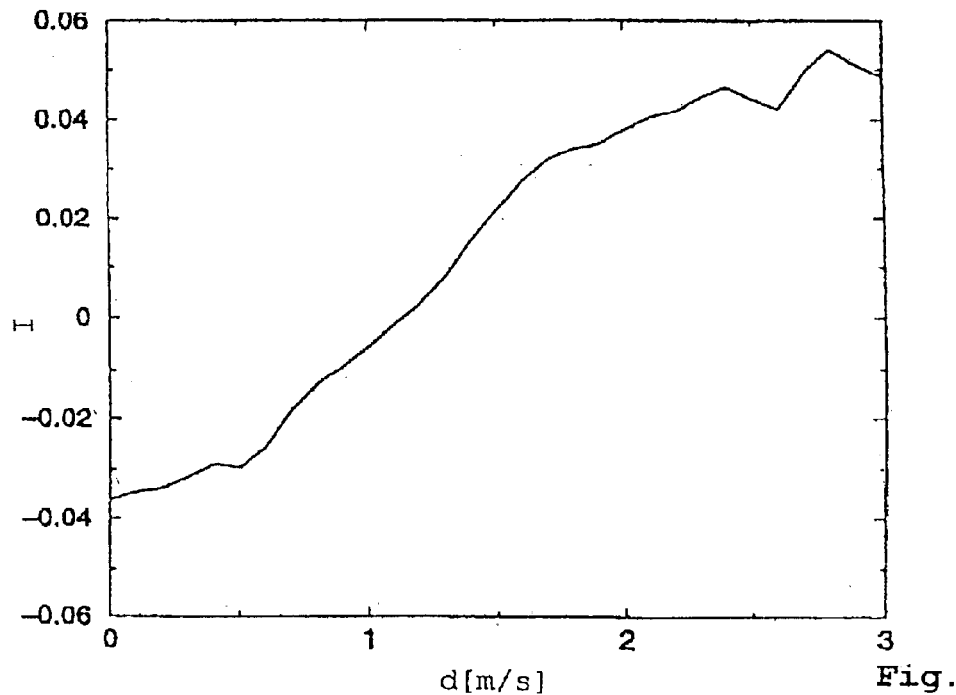
Figure 6:
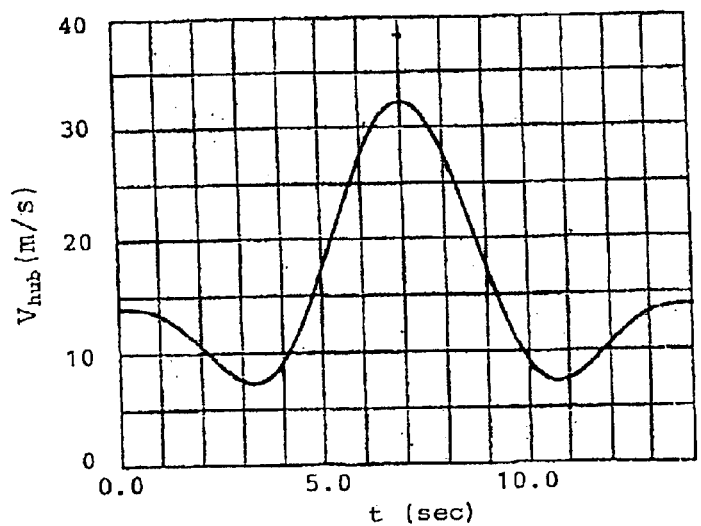
Figure 7:
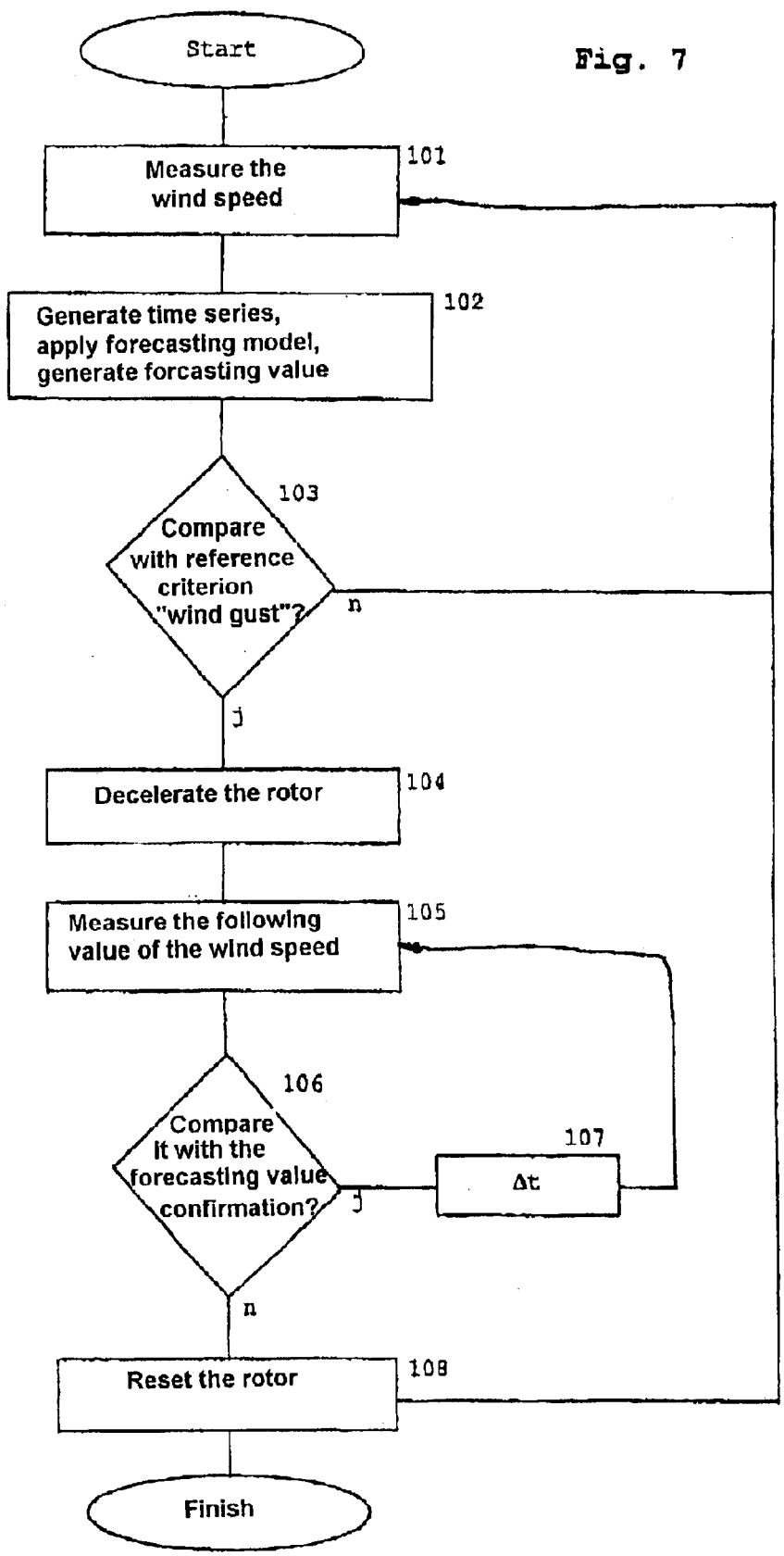
Figure 8:
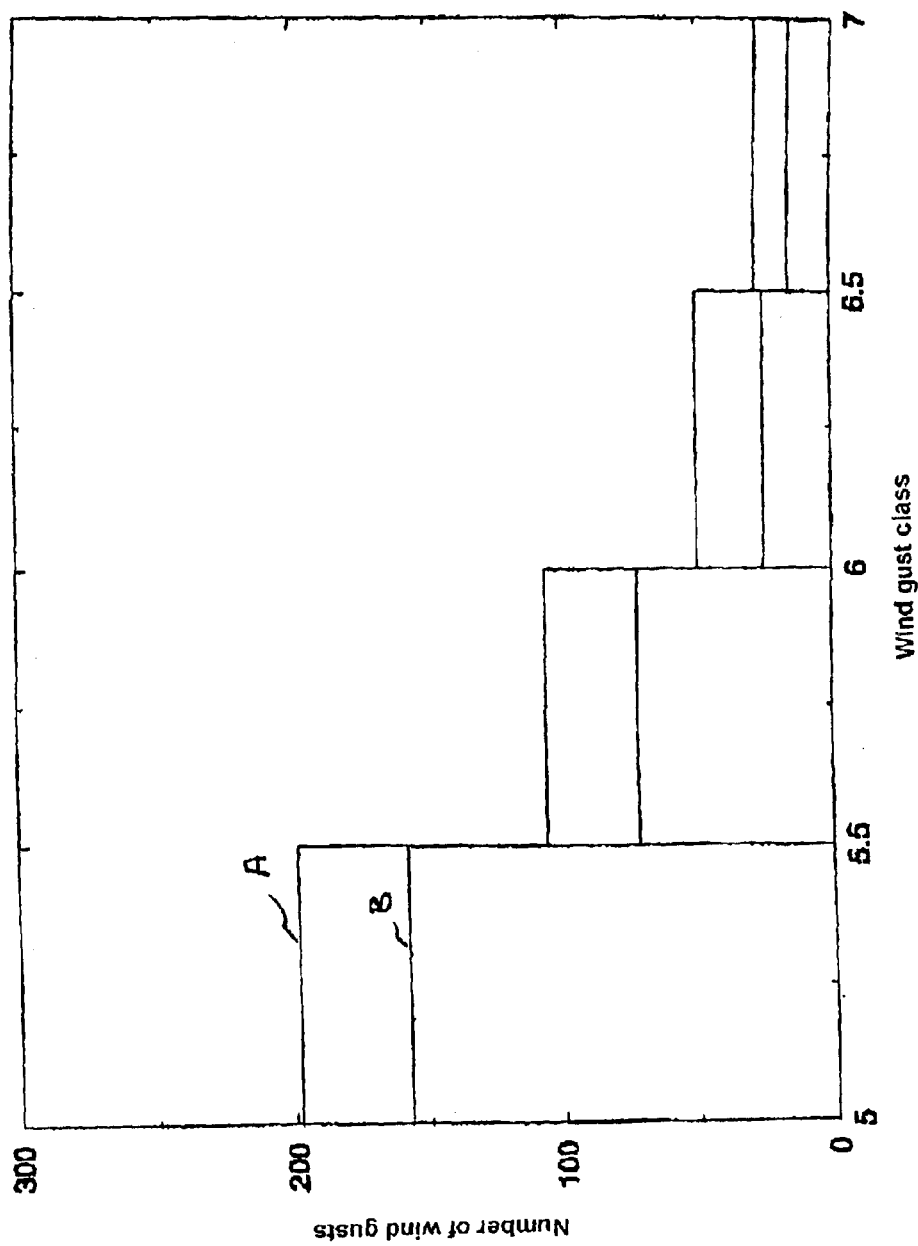
Figure 9:
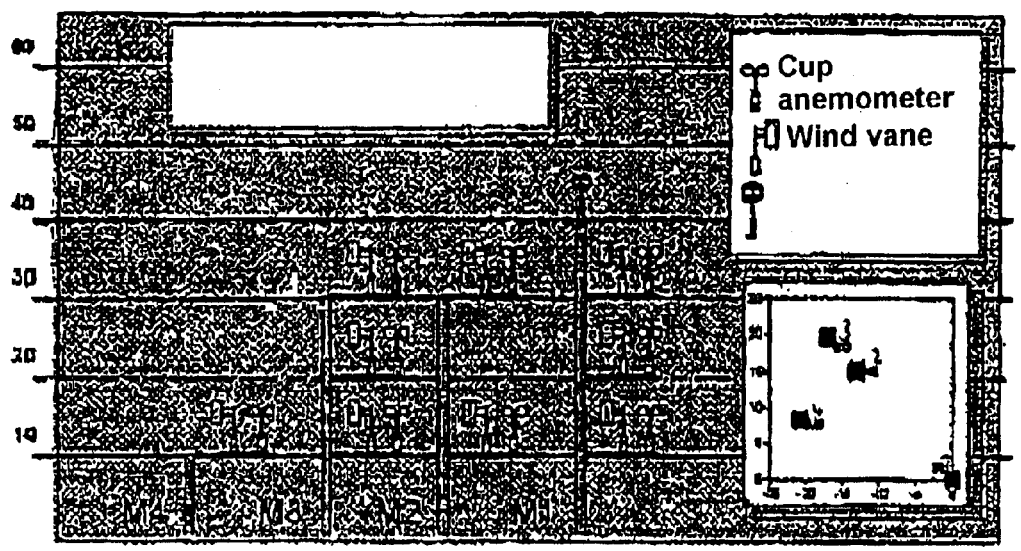

Further advantages and details of the invention are provided in the description of the enclosed drawings. The following are shown:

FIG. 1: a diagrammatic illustration of the control system according to the invention, of a wind power generator;

FIG. 2: a graphical representation of a time series of wind speed data;

FIG. 3: graphical representations for comparing the prediction error of various prediction models;

FIG. 4: a graphical representation of the correlation between the prediction error of the nonlinear deterministic model and the current wind speed change;

FIGS. 5a–d: graphical representations of further characterisation of the prediction models;

FIG. 6: a diagrammatic illustration of the time series of a wind gust;

FIG. 7: a flow chart to illustrate an embodiment of the invention;

FIG. 8: a diagram for classifying wind gusts;

FIG. 9: a diagrammatic representation of the uptake of flow data during processing of multivariate time series; and FIGS. 10a–d: graphical representations for illustrating advantages of the method according to the invention.

Below, the invention is explained with reference to applications in predicting gusts in airstreams near the ground, without, however, being limited to such applications. With the use of adapted measuring processes, reference criteria and the like, the invention can analogously be used for turbulence prediction in other gaseous or liquid media, provided the respective system shows correspondingly coherent nonlinear effects.

The following explanation relates to an implementation of the method according to the invention where the measured wind speed is used as the flow parameter. Implementation of the invention, based on time series of the electrical output measured on a wind power generator, takes place analogously.

FIG. 2 shows an example of the wind speeds acquired by means of a cup anemometer 2 of a wind generator (see FIG. 1) over a twenty-four hour period in a flat landscape close to the coast. The anemometer was situated at a height of ten metres above ground and was sampled at a sampling rate of 8 Hz. The measured values result in a time series which is stochastically structured on all time scales. The measured values of the wind speed provide the flow parameters processed in the method according to the invention. The wind speeds are scalar quantities $s_n$ which form a time series $\{S_k\}$. A diagram of the electrical output of the generator in the same time period would show a similar image to the one shown in FIG. 2. Accordingly, the measured values of the electrical output are scalar quantities which form a time series. In modified applications of the invention, the elements of the time series can also be vectorial quantities. The following prediction models are available for analysing time series.

Illustration and Comparison of the Prediction Models (i) For conventional linear-stochastic prediction, for example an autoregressive model (AR model) is used. In an AR model, the present or latest value of a time series according to equation (1) is the sum of a linear combination of earlier values and an additive noise.

$$s_n = \sum_{j=1}^{M_{AR}} A_j s_{n-j} + b + \eta_n \quad (1)$$

In the above equation, $M_{AR}$ refers to the order or dimension of the AR model; $A_j$ and b to the parameters of the linear combination; j and n natural numbers for denominating the respective time series value; and $\eta_n$ the noise portion according to a white Gauss noise. The parameters of the AR model are determined according to equation (2) by minimising the prediction error. In this case the index k in equation 2 extends over the entire training quantity. The training quantity can be varied within the framework of an adaptive AR model; in the examples provided, it covers the last seven hours of the time series. The order $M_{AR}$ of the models has to be selected in an application-specific way, depending on the task. Linear-stochastic models, such as e.g. the AR model, are known per se.

In a multivariate AR model, the values $s_n$ can also be measured values of other quantities, e.g. the wind speeds of other measuring locations.

An essentially linear method is also provided by the known so-called Kallman filter which does not however permit any separation of system states in the nonlinear deterministic sense.

(ii) In nonlinear deterministic prediction according to the invention, the behaviour of the time series is understood to be a nonlinear deterministic chaotic process. In this approach, short term predictions are possible in principle, although the measured time series, e.g. the wind speed or the electrical output, appear to be irregular and stochastic. The principle of analogy constitutes the core of nonlinear deterministic prediction. The inventors found that in the processing, according to the invention, of flow data, it can be assumed that the continuation, to be determined, of the current measurement series will be similar to the observations which were obtained in the past in a similar situation. Using the method according to the invention, the terms "situation" and "similar", which are used here, assume a quantitatively and algorithmically useable significance. A situation is characterised by the wave shape of the curve of the respectively processed flow parameters during a suitably selected time interval. The similarity of situations can then be quantified using standard interval measurements.

In the procedure according to the invention, the approach is as follows. In the entire available data quantity (measured time series) a search is made for curve progressions which are of adequate similarity to the progressions in the last few seconds prior to a currently examined point in time. Subsequently, a prediction of the further development of the flow parameter examined (e.g. wind speed or power output) in the following seconds is made by a weighted average over the correspondingly following sequences of similar curve progressions of the past. The method is formally described by reconstructing trajectories of the deterministic dynamics in n-dimensional spaces. From successive data points si to the times i, so-called n-dimensional embedding vectors or time-offset vectors (see below) are formed. These vectors describe states in an n-dimensional state space, with successive states forming the trajectories. The concept of determinism used according to the invention is based on tracking these trajectories into the future.

The states x of a dynamic system are described by a motion equation according to $X_{n+1}=F(x_n)$ in a state space. As a rule, the motion equation, or the nonlinear image, is a complex differential equation. If the function F is not known, it can, however, be linearly approximated from long time series of states $\{x_k\}$, k=1, ..., N, by examining all the states $y_k$ in the surrounding (or: neighbourhood) $U_n$ of a state $X_n$ and by minimising the function (2).

$$\varepsilon_n^2 = \sum_{k:\, y_k \in U_n} (A_n y_k + b_n - y_{k+s})^2 \quad (2)$$

The quantity $\varepsilon_n^2$ represents a prediction error relating to the factors $A_n$ and $b_n$. The implicit expression $A_n Y_k + b_n - Y_{k+s} = 0$ illustrates that the values which correspond to the above-mentioned motion equation are limited to one hyperplane within the state space to be examined. The prediction error can be minimised according to the method described by J. D. Farmer (see above) ("Farmer-Sidorowich-method"). The factors of linear combination in the case of minimal prediction error in turn make it possible to determine the prediction value $X_{n+s}$ from the above time series.

The method which is used in the implementation of the invention in a univariate case is based on the fact that in the present time series only a sequence of scalar values $s_n$ is recorded from wind data. From these, the phase space vectors to be reconstructed are determined with the concept of time offset vectors, as described in detail by F. Takens, "Detecting Strange Attractors in Turbulence" in "Lecture Notes in Math", vol. 898, Springer, N.Y., 1981, or by T. Sauer et al. in "J. Stat. Phys.", vol. 65, 1991, p. 579 and described with illustrations below. These publications are thus completely incorporated in the present description.

Starting from a scalar time series $\{s_k\}$ time-offset vectors are formed in an m-dimensional space according to $\hat{s}_n = (S_n, S_{n-\tau}, \ldots, S_{n-(m-1)\tau})$ (n: current index of the time series). If a multivariate time series is measured, $\hat{s}_n$ can also be formed from the various components of the vector-value time series. The parameter m is the embedding dimension of the time offset vectors. The embedding dimension is selected depending on the application; it exceeds double the value of the fractal dimension of the attractor of the examined dynamic system. The parameter $\tau$ is a sampling interval (or "time lag") which represents the interval of subsequent elements in the time series. The time offset vector is thus an m-dimensional vector whose components comprise a particular time series value and the (m−1) preceding time series values. It describes the development over time of the system during a time range or an embedding window of duration m·$\tau$. With every new sampling value, the embedding window is displaced within the entire time development, each time by one sampling interval. The sampling interval $\tau$ in turn is a quantity selected depending on the application. If the system shows little change, a larger sampling interval can be selected so as to prevent the processing of redundant data. If the system changes quickly, a shorter sampling interval must be selected because otherwise the correlations which occur between adjacent values would introduce errors during further processing. Selecting the sampling interval $\tau$ is thus a compromise between the redundancy and the correlation between successive states. For turbulence forecasting, the parameters m and $\tau$ are selected in a suitable way according to the principles which have been described by J. F. Gibson et al. in "Physica D", vol. 57, 1992 pp. 1 ff. This publication is herewith also incorporated by reference into the present description.

The prediction value $X_{n+s}$ can be determined in accordance with equation (2), from the local linear approximation of the nonlinear function F. After this, in linear approximation $X_{n+s} = A_n \cdot x_n + b_n$ applies. Essential in this context is that $A_n$ and $b_n$ depend on the respective local neighbourhood $U_n$ rather than being constant over the entire time series as is the case with the AR model. According to the invention, a locally constant phase space model is regarded as the zero approximation. With the locally constant model, the prediction value $X_{n+s}$ is simply the average value from the future values of the phase space neighbours $y_n$ of the states $x_n$ according to $$x_{n+s} = \sum_{k: y_k \in U_n} y_{k+s}$$

If instead of measuring a scalar time series, a vector-value time series is measured, then the individual components of the phase space vector can also be formed from the components of the vector-value time series (e.g. wind speeds which were measured on various neighbouring generators). It is also possible to combine time offset embedding with the use of vector value information of the time series.

(iii) FIG. 3 illustrates in sections the application of the above mentioned prediction models for turbulence forecasting on a univariate time series of wind data. For the linear-stochastic AR model, $M_{AR}$=20 was selected, while for the nonlinear deterministic analysis $\tau$=0.125 s and a 20-dimensional delay vector were selected. At least fifty neighbour values were taken into account. The prediction period was forty measuring increments or five seconds respectively. These parameters are mentioned only as examples. Depending on the situation, the parameter settings may be varied.

FIG. 3 shows the prediction error depending on the time, which was determined from the time series according to FIG. 2, for both models. It shows that in the case of small prediction errors, when the system is in a non-turbulent state, the (global) linear-stochastic model (shown by a dot-dash line) returns similar or better results than the (local) nonlinear deterministic model (shown by a solid line). Small prediction errors signify small wind speed changes so that the minimums in the graphical representations according to FIG. 3 correspond to the non-turbulent areas. On the other hand, in turbulent areas with large prediction errors the nonlinear deterministic model provides significantly better, i.e. relatively smaller, prediction errors than the linear-stochastic model.

The method according to the invention is based on these findings. From the measured time series of wind data (e.g. wind speeds) prediction values are continually generated as differential values between the prediction data and the persistence. Depending on whether the current prediction value is below or above a limit which has been set so as to be application-dependent (threshold value) a wind gust is predicted, i.e. a control signal is generated. Generally speaking, it is provided for the control signal to be generated if the deviation between the prediction value of a time series and the current value of the examined signal exceeds the threshold value (see also FIGS. 5a to c). The threshold value for wind gust forecasting is for example in the region of 1 to 2 m/s.

Figure 5A:
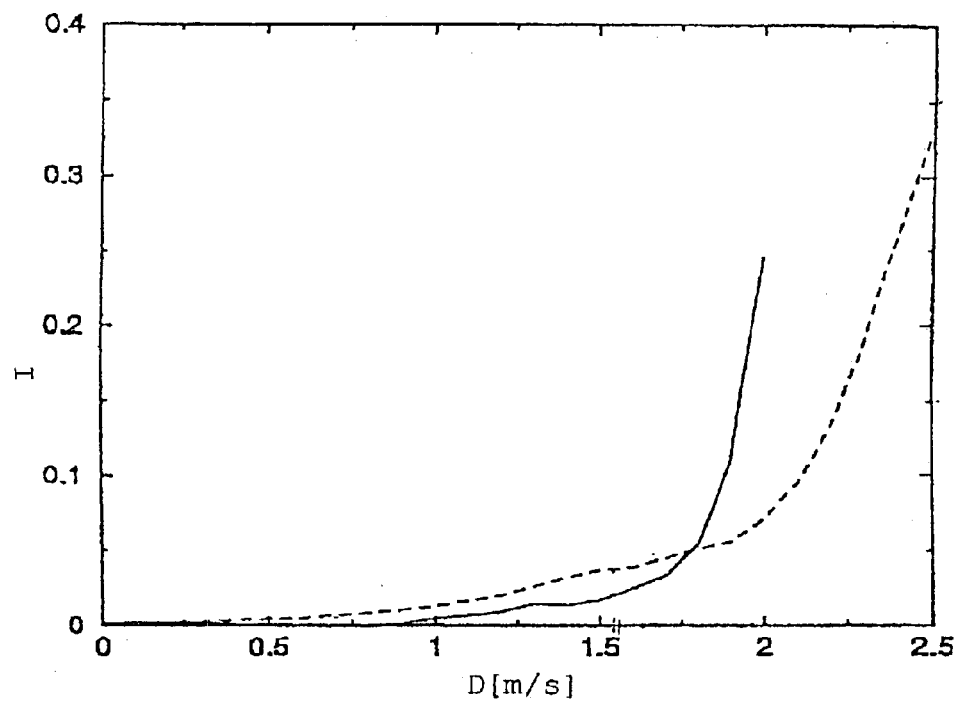
Figure 5B:
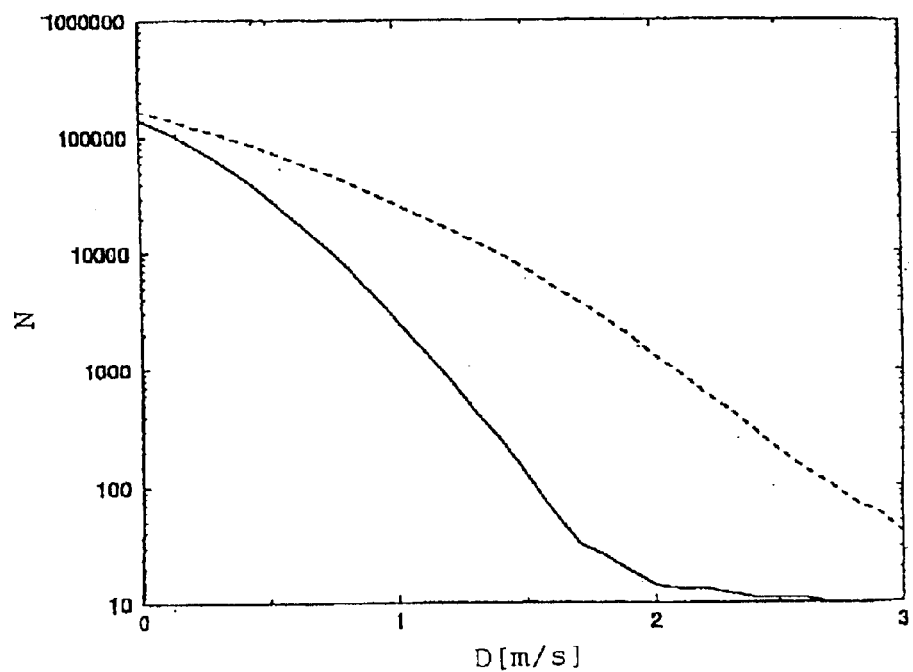

The result illustrated in FIG. 3 is also confirmed by the FIGS. 4, 5a and 5b. FIG. 4 shows the relative improvement of the nonlinear deterministic model in comparison to the linear-stochastic model, said relative improvement being described by the parameter $I=(\epsilon_{AR}-\epsilon_{NL})/\sigma$, in dependence on the deviation d of the value to be forecast of the persistence. In the above, $\epsilon_{AR}$ denotes the prediction error of the AR model, while $\epsilon_{NL}$ denotes the prediction error of the nonlinear model. The unit of the quantity d corresponds to the measured speed signal [m/s]. In the case of small d-values, the parameter I of the improvement is negative, i.e. the linear-stochastic model provides a better forecast than the nonlinear deterministic model. In the case of large d-values, the relationship is the other way round.

FIG. 5a shows the parameter I of the average relative difference (improvement of the forecast) depending on various threshold values D in the case of forecasts of the respective sequential value with the linear-stochastic model (shown by a solid line) and with the nonlinear deterministic model (dashed line). In particular for predicting large increases in the wind speed, the prediction improvement according to the invention, using the nonlinear model, is of the order of magnitude of the variance of the data. This is a significant advantage of the invention.

In FIG. 5b the total number N of situations in which the control signal is correctly generated, i.e. the wind gust is correctly forecast, is illustrated depending on the threshold value D. It shows that relatively often occurring small changes in speed are usually forecast by both models. The majority of large fluctuations, however, are only predicted by the nonlinear deterministic model. The use, according to the invention, of the nonlinear model for forecasting wind gusts is based on this result.

Figure 5C:
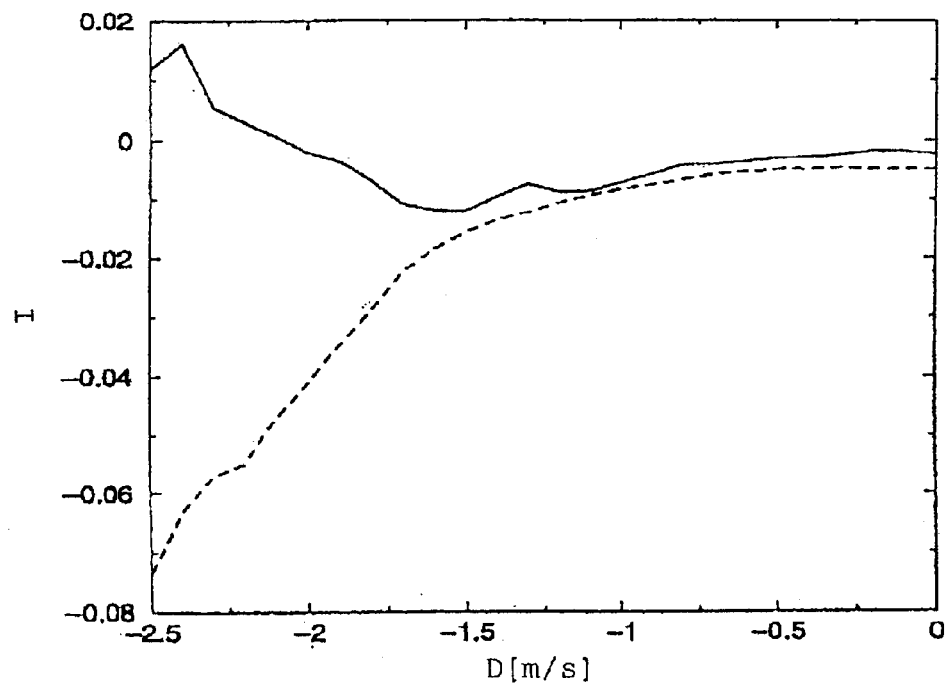

In the case of negative speed changes, i.e. in the case of a reduction in wind speed, the behaviour is different, as illustrated in FIG. 5c. When the wind abates, no improvement of the deterministic model in comparison to the stochastic model is achieved.

Figure 5D:
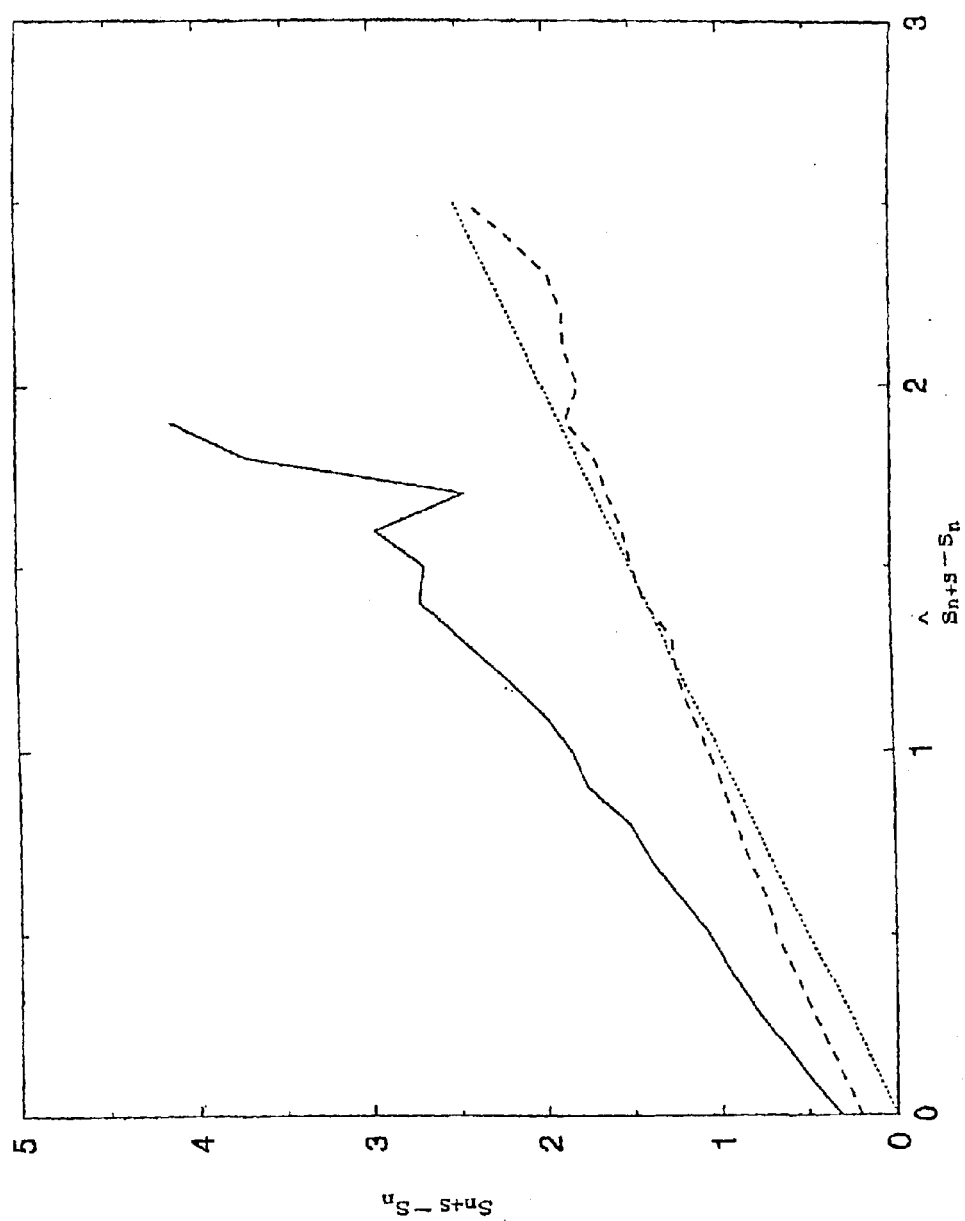

FIG. 5d shows that a locally constant model indeed provides a very accurate forecast of the positive speed change; in contrast to this, a linear model systematically underestimates changes in speed. FIG. 5d shows the effective average speed change $s_{n+s}-s_n$ compared to the forecast increase in speed $\hat{s}_{n+s}-s_n$. The dashed line corresponds to the observation in regard to the locally constant model, while the solid line corresponds to the observation in regard to the linear model. Moreover, the diagonal is shown on which the average speed changes would ideally be located. It is clear that the average speed fluctuations are significantly more pronounced than predicted by a linear model. Good forecasting of the average fluctuations by the locally constant model shows that the turbulent fluctuations in speed indeed satisfy the Markov characteristic.

Controlling a Wind Power Generator

In the previous paragraph it has been shown that forecasting can be significantly improved with the use of the nonlinear deterministic prediction model. Apart from the above-mentioned increase in the prediction value above a predetermined threshold value, alternatively, the (forecast) variation in time of the wind speed per se can also be used as a trigger for forecasting wind gusts. The latter is based on the determination of typical variations in speed per se. The latter is based on the determination of typical variations in speed in the build-up of turbulence or a wind gust.

By way of illustration, FIG. 6 shows a typical variation in speed of wind gusts (see "Wind Conditions for Wind Turbine Design", International Energy Agency, 2nd Symposium, April 1999, ISSN 0590-8809). Starting from an average speed, there is first a minimum, followed by an increase to a strong maximum with a renewed decrease to a minimum and finally an increase to the average speed. In turbulence forecasting, passing through the first minimum can be the time domain which is of interest for forecasting purposes. In this time domain, the above-mentioned time-offset vector undergoes particular changes. As soon as this has been detected by comparison with the neighbour in the phase space, wind gust forecasting takes place. However, wind gust forecasting can also be based on other time domains.

In order to control a wind generator 1 which is diagrammatically shown in FIG. 1, an anemometer 2 continuously measures the wind speed, or an output meter continuously measures the output of the wind generator; the measured speed data or output data is evaluated using the method explained with reference to FIG. 7, and after forecasting a wind gust, the operational parameters of the wind generator 1 are adjusted. Adjusting the operational parameters means that, for example, the angles of incidence of the rotor blades 3 are changed (e.g. by 1°) or the rotor speed is electrically decelerated. In order to implement the method according to FIG. 7, a device 4 for processing the wind data is provided, with the particulars of said device 4 being disclosed below.

According to the flow chart in FIG. 7, the anemometer 2 continuously measures the wind speed (step 101). The wind speed or quantities derived thereof, e.g. the electrical output which is being measured, the change in wind speed or time-offset vectors from the time series, are subjected in step 102 to processing for preparing a characteristic forecast value, which at step 103 is compared to a predetermined reference criterion (threshold value). Wind data processing at step 102 is preferably carried out using a so-called box algorithm (see H. Kantz et al. in "Nonlinear Time Series Analysis", Cambridge University Press, Cambridge, 1997, chapter 4) by means of which the number of data to be evaluated in real time is reduced from approx. 150,000 to a few hundred items. The box algorithm is an algorithm for fast neighbour search in n-dimensions (box assisted search).

When the threshold value comparison 103 results in a forecast of low wind speeds or low turbulence, then a return to step 101 takes place. However, if the threshold value comparison 103 shows a considerable deviation from the persistence or from low-turbulent states, then the control signal for decelerating the wind generator is generated (step 104). In the case of modified applications, it is also possible to generate a warning signal or display signal. Subsequently, a new speed reading 105 takes place, and at step 106 a comparison with the forecast value takes place.

If during comparison 106, the predicted wind gust is confirmed, then there is a waiting step or delay step 107. During step 107, the generator is operated in the decelerated state. This takes place according to experience values in a time domain between approx. 1 to 5 seconds. Subsequently, there is a return to step 105. If during comparison 106, the forecast gust is not confirmed, then at step 108 a return of the generator to the non-decelerated state and a return to step 101 take place.

In order to implement this procedure, the device 4 (see FIG. 1) comprises an arithmetic-logic unit for determining the prediction value (step 102), a comparison unit for implementing the comparison step 103 and for predicting a wind gust, an actuating device for decelerating (104) the generator, and a further comparison unit (step 106) with a clock pulse circuit (step 107). The actuating device comprises in particular actuating drives for changing the angle of incidence of the generator blades 3 or electrical actuating devices for increasing the electrical resistance of the generator. These actuating devices are formed by electronic control circuits for increased output decoupling from the generator.

In accordance with particular speed criteria, wind gusts can be allocated to various wind gust classes (e.g. from 1 to 10). FIG. 8 signifies an important advantage of the invention by means of the number of wind gusts in the various wind gust classes, which wind gusts are acquired by the wind generator. If a wind gust in a class is correctly forecast using the method according to the invention, then the wind generator is decelerated in time. Consequently, no dangerous increase in the rotary speed of the rotor takes place, i.e. the generator does not acquire the wind gust. The number of acquired wind gusts is significantly reduced in each wind gust class (A: number without prediction model; B: Number with the prediction model applied according to the invention).

In all wind gust classes, fewer wind gusts are acquired. In the classes with the highest wind speeds, which are thus particularly dangerous, the number of the wind gusts acquired can be reduced to zero. Accordingly, the wind generator can be operated at an average rotary speed which permits a reduced safety margin to the dangerous wind gust values. This results in increased effectiveness of generator operation. The increase in effectiveness can be estimated as follows: with the wind speed, the generator output typically increases at $v^3$. If the wind generator, averaged over time, is operated with a better angle of incidence of the rotor blades, then there is a respective increase in electrical output.

(iv) Below, the application of the above-mentioned prediction models for forecasting turbulence is explained by means of a multivariate time series of wind data. While in the univariate version linear correlations of the prediction value to several values of the time series in the past are determined, the multivariate method focuses on the evaluation of correlations of the predicted value with values of wind speed and wind direction at various spatial points. In this process, the spatial correlations can depend on the respective wind direction at the time.

Nonlinear phase space methods are suitable for implicit processing of nonstationarities and for dynamically separating various situations from each other. This characteristic makes nonlinear deterministic methods significantly superior when compared to linear approaches in weather situations in which for example the wind speed varies. This is based on the fact that in order to estimate the future value of the wind speed, only weather situations from the past are taken into account which resemble the current situation, if for example the same average wind direction predominates.

For quantitative analysis of this phenomenon, a multivariate time series with 9 simultaneous readings of the wind speed and 9 readings of the wind direction were used. This results in 18 dimensional embedding vectors, in other words an AR model of the order of 18. The measuring arrangement is diagrammatically illustrated in FIG. 9. The wind generators are aligned in rows arranged differently over an area. The prediction error was evaluated for 30,000 points in time, i.e. approximately 1 hour in the time series. One day in the time series was used as a training interval. In the case of forecasting horizons from approximately 10 seconds onward, the improvement is approximately 5%. The exact value of the improvement depends on the type of the weather situations examined. In situations where there are considerable fluctuations in wind direction, the superiority of the nonlinear methods is more pronounced than in situations in which the wind direction is almost constant. Since the extent of nonstationarity of the weather depends on the respective geographic and orographic conditions, the specific efficiency of the nonlinear methods will have to be determined anew for each spatial location of the application.

In multivariate prediction of wind speeds, nonlinear methods can be clearly superior. However, the exact degree of superiority and the ideal time horizon of a nonlinear forecast additionally depend on the weather situation examined, the geographical position and the spatial arrangement of the measuring instruments. For example, a spatial distance of the sensors around approximately 30 m resulted in forecasting horizons in the seconds region. Time horizons in the minute regions to hour regions require measurements at larger spatial distances.

The improved forecasts obtained with the multivariate nonlinear deterministic model can be used for permanent or temporary control of various technical processes. For example, in wind energy conversion, technical parameters of the turbine or an additional diesel unit can be controlled. If an increased wind speed is predicted, increased output of the wind generators can be expected so that conventional generators with a lesser output which are operated in a parallel or in a supplementary capacity can be operated (or vice-versa). On an extended time horizon, control of conventional power stations is also possible. Such control can be permanent or it can be restricted to times of considerable variations in the flow parameters that have been forecast.

(v) FIGS. 10a–d illustrate comparisons between the method according to the invention and conventional methods, namely persistence forecast and linear autoregressive models, using measurement results derived from a practical application of a wind power generator. The electrical output measured at the wind power generator was used as a flow parameter evaluated according to the invention.

Figure 10A:
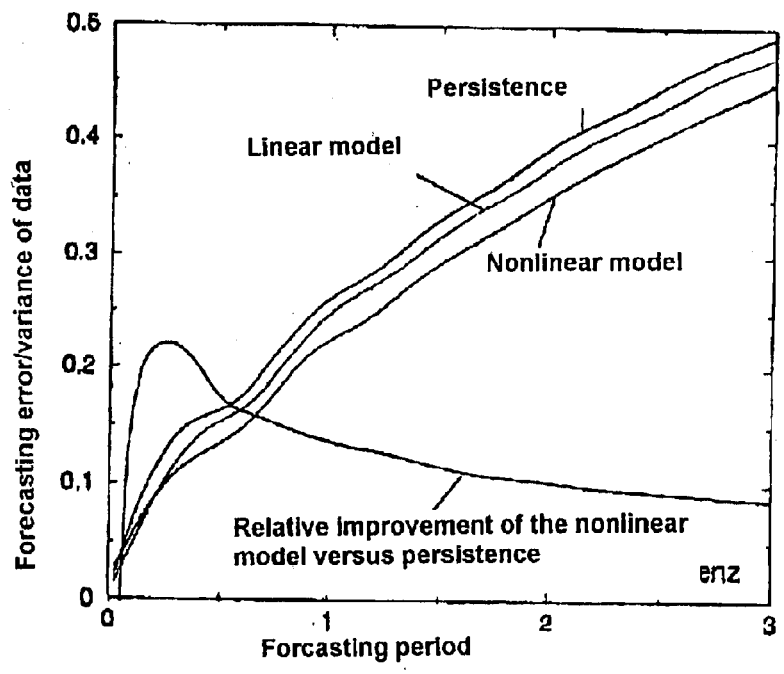

FIG. 10a shows the relative prediction error of the electrical output for the various models which are indicated in the graphical representations, and the relative improvement of the nonlinear model when compared to the persistence model (lower graph). According to the invention, the average prediction error during output forecasting of wind power generators is up to 10% smaller than with the conventional linear models, and even up to 20% smaller than in the persistence model. The fact that such improvement occurs within a few seconds is of particular advantage. During this time, wind power generators can be effectively adjusted to the impending turbulence.

Figure 10B:
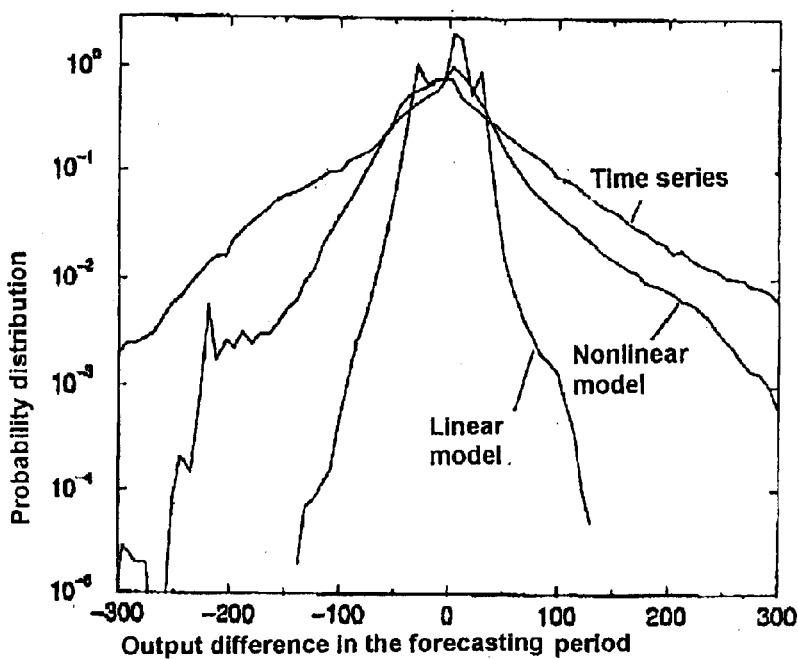

FIG. 10b shows that the fluctuations in output which are forecast by the nonlinear model describe the actual increments in output significantly more accurately than is the case with conventional linear models. FIG. 10b shows the probability distribution of the output increments in a forecasting time frame of a few seconds. Extensive fluctuations in performance which occur relatively often are predicted better by the nonlinear model used according to the invention.

Figure 10C:
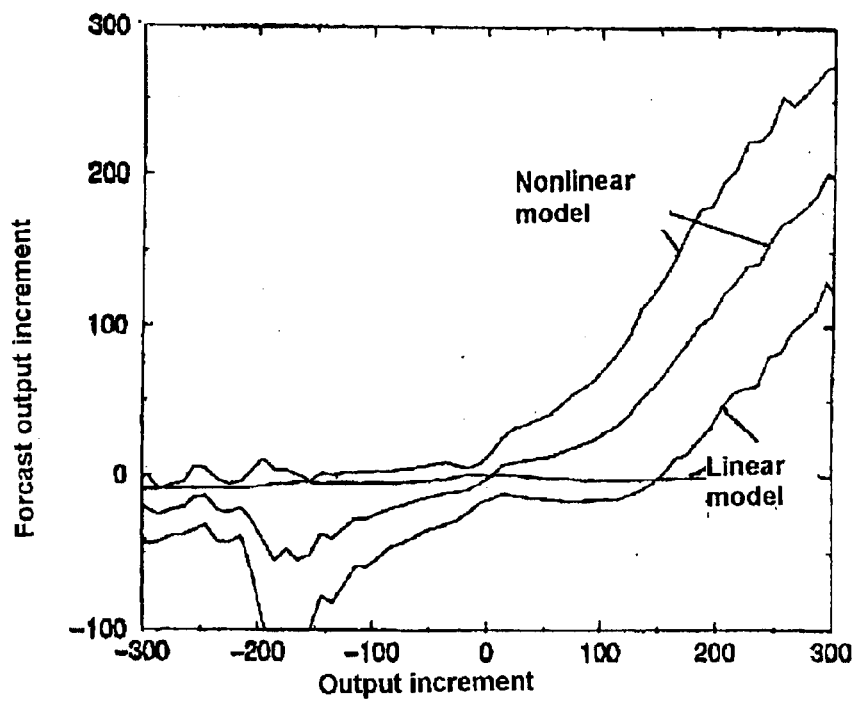

Especially in situations in which very considerable output fluctuations occur or are forecast by the nonlinear model, the forecasts of the nonlinear model are significantly more accurate than those of a conventional linear model. This is shown in FIG. 10c with the representation of the average forecast output increments depending on the actual output increment for both models. The results were obtained with a 660 kW plant, with a forecasting horizon of one second. For predictions of the nonlinear model, the scatter of predictions at the level of the standard deviation from the average predictions is also shown. It is evident that in particular in the case of considerable increments, the nonlinear model properly describes the actual fluctuations on average. By contrast, a linear model is unsuitable for describing the data.

Figure 10D:
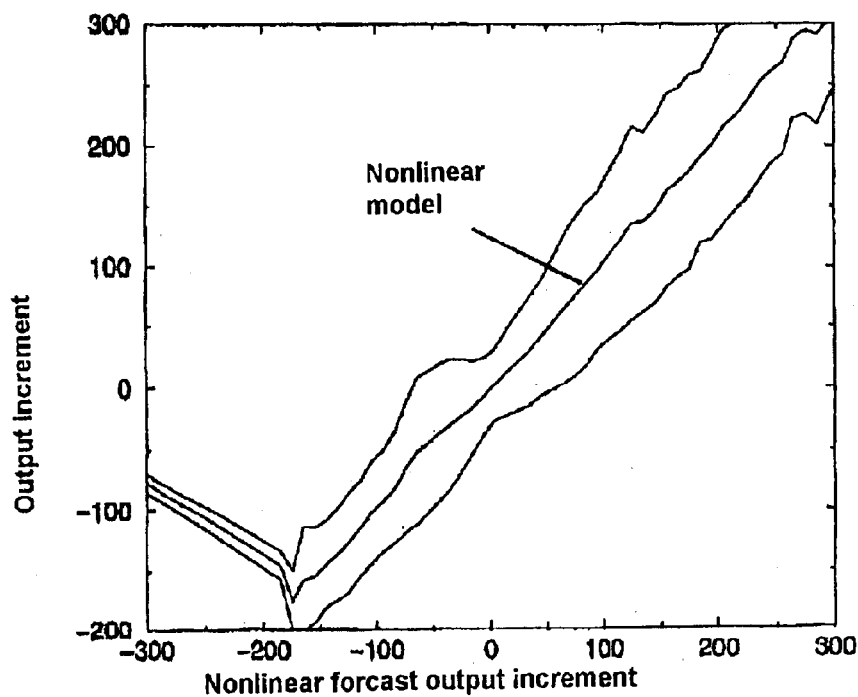

FIG. 10d shows the actually observed increments in situations where the nonlinear model forecasts considerable fluctuations (middle graph). Here again, the standard deviation in the scatter of the predictions was deducted or added (lower and upper curve). This representation demonstrates the reliability of predicting according to the invention. It is evident that considerable fluctuations that are forecast not only imply considerable actual increments on average, but also that this is the case in every situation. A clear asymmetry of the forecast is evident. Positive increments can be forecast better than negative increments. The reason for this is that the output is cut off at 660 kW. Negative increments cannot announce themselves by a typical pattern in the output time series.

The characteristics of the invention which have been disclosed in the above description, in the drawings and in the claims, can be of importance to the implementation of the invention in its various embodiments both individually and in any desired combination.

What is claimed is:

1. A method for processing and predicting flow data of a flowing medium, in which from values of at least one flow parameter, which are successively measured on a continuous basis at one or various locations in the medium, said flow parameter being characteristic for the speed of the medium, a time series is formed and updated, which time series being subjected to a nonlinear deterministic prediction procedure on the basis of a locally constant phase space model for generating prediction values for the respective subsequent flow parameters, wherein a predetermined control signal is generated if the prediction values are characteristic for an impending change in the flow speed, wherein the flow data comprise wind data of an air stream close to the ground, or output data of a wind power generator, and the control signal is formed if the arrival of a wind gust or a change in the average wind speed is predicted.

2. The method according to claim 1, wherein the flow parameter comprises a flow speed, an electrical output of an energy converter arranged in the flowing medium, or a change in the flow speed.

3. The method according to claim 2, wherein the prediction values comprise predicted values of the flow speed; the electrical output of the energy converter arranged in the flowing medium; or of the change in the flow speed.

4. The method according to claim 3, wherein the difference between prediction values and persistence constitutes a relevant controller output for subsequent control methods.

5. The method according to claim 1, wherein the wind speed or the electrical output of the wind power generator is measured as the flow parameter, and the arrival of a wind gust is predicted when the prediction deviation of the wind speed and the persistence of the electrical output exceeds a predetermined threshold value.

6. The method according to claim 1, wherein the wind speed is measured with an anemometer or an output meter of a wind power generator, and wherein the control signal which is generated when a wind gust is predicted initiates deceleration of the wind generator.

7. The method according to claim 6, wherein deceleration of the wind power generator comprises a reduction in the angle of incidence of the rotor blades of the wind generator and/or electrical regulation of the generator resistance.

8. The method according to claim 1, wherein as the flow parameter, the wind speed is measured in several locations and is forecast with a locally constant model, and a control signal is generated if the predicted average deviation of the wind speed exceeds a threshold value.

9. The method according to claim 8, wherein the control signal causes conventional energy converters to be set to a changed output.

10. A method according to claim 1, in which the wind speeds or output data $S_n$ are processed as flow data, according to the following steps:

a) acquisition of a multitude of wind speed values or output data $S_n$ at a sampling interval $\tau$;

b) formation of time-offset vectors, each of which comprising components $S_n$, wherein the number m of said components represents the embedding dimension, the width of the embedding window being m·$\tau$, and for each of said time-offset vectors a neighbourhood U is formed from all time-offset vectors and the interval between said time-offset vectors and the respective time-offset vector being currently examined e, is smaller than a predetermined value $\epsilon$; and c) determination of a prediction value $S_{n+1}$ as an arithmetic average value from the future values of the neighbours of the respective current time-offset vector in the neighbourhood U.

11. The method according to one of claim 5, wherein the wind speed is measured with an anemometer or an output meter of a wind power generator, and wherein the control signal which is generated when a wind gust is predicted initiates deceleration of the wind generator.

12. A device for processing flow data of a flowing medium, which comprises a measuring device for measuring values of at least one flow parameter which is characteristic for the speed of the medium, a computing device for preparing and processing time series based on a nonlinear deterministic prediction model, a comparison device for comparing prediction values with predetermined reference criteria, and an output device for prediction values and/or control signals derived therefrom, which forms part of a control unit of a wind power generator, whereby the measuring device is an anemometer or an output meter, and an actuator device is provided for decelerating the wind generator when predetermined prediction values and/or control signals are output.

13. Wind power generator comprising a device according to claim 12.

14. The method according to claim 11, wherein deceleration of the wind power generator comprises a reduction in the angle of incidence of the rotor blades of the wind generator and/or electrical regulation of the generator resistance.

* * * * *